US007769765B2

(12) United States Patent
Stemmle

(10) Patent No.: US 7,769,765 B2
(45) Date of Patent: Aug. 3, 2010

(54) METHOD AND SYSTEM FOR SORTING MAIL

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 555 days.

(21) Appl. No.: 11/492,275

(22) Filed: Jul. 25, 2006

(65) Prior Publication Data

US 2008/0027986 A1 Jan. 31, 2008

(51) Int. Cl.
*G06F 7/00* (2006.01)
*G06F 17/30* (2006.01)

(52) U.S. Cl. .................................................... 707/752

(58) Field of Classification Search ....................... None
See application file for complete search history.

(56) References Cited

U.S. PATENT DOCUMENTS 3,420,368 A 1/1969 Sorrells
3,452,509 A 7/1969 Hauer
3,587,856 A 6/1971 Lemelson
3,757,939 A 9/1973 Henig
3,889,811 A 6/1975 Yoshimura
3,901,797 A 8/1975 Storace
3,904,516 A 9/1975 Chiba
3,933,094 A 1/1976 Murphy
4,008,813 A 2/1977 Leersnijder
4,058,217 A 11/1977 Vaughan
4,106,636 A 8/1978 Ouimet
4,169,529 A 10/1979 Hunter
4,244,672 A 1/1981 Lund
4,507,739 A 3/1985 Haruki (Continued)

FOREIGN PATENT DOCUMENTS

JP 1-159088 A 6/1989

(Continued)

OTHER PUBLICATIONS

"Development of in-process skew and shift adjusting mechanism for paper handling," American Society of Mechanical Engineers http://www.directtextbook.com, 1998.

*Primary Examiner*—Pierre M Vital
*Assistant Examiner*—Augustine Obisesan
(74) *Attorney, Agent, or Firm*—Leland Schultz; Roberts Mlotkowski Safran & Cole, P.C.

(57) ABSTRACT

A method and system for sorting mail includes the steps of imaging a face surface of the mailpieces to acquire mailpiece delivery information and distributing the mailpiece image to a virtual sorting station. The virtual sorting station is operative to sort each mailpiece image into one of a plurality of database files based upon common mailpiece delivery information. Depending upon the number of virtual sorting stations required to perform the sorting operation, the mailpiece delivery information contained in each database file may be processed by a system controller and/or transmitted to an automated mailpiece sorting device where each mailpiece is physically sorted into one of a plurality of mailpiece containers. The system for sorting mail includes an imaging device, a virtual sorting station for virtually sorting the mailpiece images and an automated sorting station for physically sorting the actual mailpieces. The system may include a plurality of virtual sorting stations wherein operators at each station provide address interpretation data to sort the mailpieces.

26 Claims, 4 Drawing Sheets

U.S. PATENT DOCUMENTS

| | | | | | |
|---|---|---|---|---|---|
| 4,627,540 | A | | 12/1986 | Takeda | |
| 4,688,678 | A | | 8/1987 | Zue | |
| 4,738,368 | A | | 4/1988 | Shaw | |
| 4,868,570 | A | | 9/1989 | Davis | |
| 4,874,281 | A | | 10/1989 | Bergerioux | |
| 4,891,088 | A | | 1/1990 | Svyatsky | |
| 4,895,242 | A | | 1/1990 | Michel | |
| 4,921,107 | A | | 5/1990 | Hofer | |
| 4,923,022 | A | | 5/1990 | Hsieh | |
| 4,965,829 | A | | 10/1990 | Lemelson | |
| 4,992,649 | A | | 2/1991 | Mampe | |
| 5,031,223 | A | | 7/1991 | Rosenbaum | |
| 5,042,667 | A | * | 8/1991 | Keough | 209/3.1 |
| 5,119,954 | A | | 6/1992 | Svyatsky | |
| 5,186,336 | A | | 2/1993 | Pippin | |
| 5,249,687 | A | | 10/1993 | Rosenbaum | |
| 5,291,002 | A | | 3/1994 | Agnew | |
| 5,470,427 | A | | 11/1995 | Mikel | |
| 5,480,032 | A | | 1/1996 | Pippin | |
| 5,718,321 | A | | 2/1998 | Brugger | |
| 5,761,070 | A | | 6/1998 | Conners | |
| 5,862,243 | A | | 1/1999 | Baker | |
| 5,893,464 | A | * | 4/1999 | Kiani et al. | 209/584 |
| 5,981,891 | A | | 11/1999 | Yamashita | |
| 6,126,017 | A | | 10/2000 | Hours | |
| 6,227,378 | B1 | | 5/2001 | Jones | |
| 6,276,509 | B1 | | 8/2001 | Schuster | |
| 6,347,710 | B1 | | 2/2002 | Ryan | |
| 6,365,862 | B1 | | 4/2002 | Miller | |
| 6,403,906 | B1 | | 6/2002 | De Leo | |
| 6,435,353 | B2 | | 8/2002 | Ryan | |
| 6,443,311 | B2 | | 9/2002 | Hendrickson | |
| 6,501,041 | B1 | * | 12/2002 | Burns et al. | 209/584 |
| 6,539,098 | B1 | | 3/2003 | Baker | |
| 6,561,339 | B1 | | 5/2003 | Olson | |
| 6,561,360 | B1 | | 5/2003 | Kalm | |
| 6,576,857 | B1 | * | 6/2003 | De Leo et al. | 209/584 |
| 6,677,548 | B2 | | 1/2004 | Robu | |
| 6,703,574 | B1 | | 3/2004 | Kechel | |
| 6,814,210 | B1 | | 11/2004 | Hendzel | |
| 6,819,777 | B2 | | 11/2004 | Baker | |
| 6,888,084 | B1 | | 5/2005 | Bayer | |
| 6,897,395 | B2 | | 5/2005 | Shiibashi | |
| 6,946,612 | B2 | | 9/2005 | Morikawa | |
| 6,953,906 | B2 | | 10/2005 | Burns | |
| 6,994,220 | B2 | | 2/2006 | Schererz | |
| 6,999,070 | B2 | | 2/2006 | Jeyachandran | |
| 7,004,396 | B1 | | 2/2006 | Quine | |
| 7,111,742 | B1 | | 9/2006 | Zimmermann | |
| 7,112,031 | B2 | | 9/2006 | Harres | |
| 7,138,596 | B2 | | 11/2006 | Pippin | |
| 7,170,024 | B2 | | 1/2007 | Burns | |
| 7,210,893 | B1 | | 5/2007 | Overman | |
| 7,227,094 | B2 | | 6/2007 | Oexle | |
| 7,235,756 | B2 | | 6/2007 | De Leo | |
| 7,259,346 | B2 | | 8/2007 | Svyatsky | |
| 7,304,260 | B2 | | 12/2007 | Boller | |
| 7,378,610 | B2 | | 5/2008 | Umezawa | |
| 7,396,011 | B2 | | 7/2008 | Svyatsky | |
| 7,397,010 | B2 | | 7/2008 | Wilke | |
| 7,397,011 | B2 | | 7/2008 | Berdelle-Hilge | |
| 2002/0053533 | A1 | | 5/2002 | Brehm | |
| 2003/0006174 | A1 | | 1/2003 | Harres | |
| 2003/0135708 | A1 | | 7/2003 | Rangarajan | |
| 2004/0031732 | A1 | * | 2/2004 | Whitnable | 209/584 |
| 2004/0059462 | A1 | * | 3/2004 | Norris et al. | 700/223 |
| 2004/0128265 | A1 | | 7/2004 | Holtz et al. | 705/406 |
| 2004/0182759 | A1 | * | 9/2004 | Jirsa | 209/583 |
| 2006/0070929 | A1 | | 4/2006 | Fry | |
| 2006/0102530 | A1 | * | 5/2006 | Karnin et al. | 209/584 |
| 2006/0124512 | A1 | | 6/2006 | Quine | |
| 2006/0180520 | A1 | | 8/2006 | Ehrat | |
| 2006/0191822 | A1 | | 8/2006 | Avant | |
| 2007/0000818 | A1 | * | 1/2007 | Delitz et al. | 209/534 |
| 2007/0090029 | A1 | | 4/2007 | Avant | |
| 2007/0131593 | A1 | | 6/2007 | Burns | |
| 2007/0272601 | A1 | | 11/2007 | Stemmle | |
| 2008/0011653 | A1 | | 1/2008 | Stemmle | |
| 2008/0012211 | A1 | | 1/2008 | Stemmle | |
| 2008/0027986 | A1 | | 1/2008 | Stemmle | |
| 2008/0093273 | A1 | | 4/2008 | Stemmle | |
| 2008/0093274 | A1 | | 4/2008 | Stemmle | |
| 2008/0164185 | A1 | | 7/2008 | Stemmle | |

FOREIGN PATENT DOCUMENTS

| | | | | |
|---|---|---|---|---|
| JP | 1-271789 | A | | 10/1989 |
| WO | 97/09689 | | | 3/1997 |
| WO | 97/49502 | | | 12/1997 |
| WO | 03/013578 | | | 2/2003 |
| WO | 03/024628 | A1 | | 3/2003 |
| WO | 2005/014189 | A1 | | 2/2005 |
| WO | WO 2005/051556 | | * | 6/2005 |
| WO | 2006/063121 | | | 6/2006 |
| WO | 2006/063125 | | | 6/2006 |
| WO | 2006/063204 | | | 6/2006 |
| WO | 2006/110465 | | | 10/2006 |
| WO | 2006/110484 | | | 10/2006 |
| WO | 2006/110486 | | | 10/2006 |

* cited by examiner

METHOD AND SYSTEM FOR SORTING MAIL

TECHNICAL FIELD

This invention relates to sorting mailpieces, and more particularly to a method and system for sorting mailpieces without a requirement to convey, transport and/or physically handle mailpieces during various intermediate sorting operations. Further, the method and system performs sorting operations without the requirement for optical character recognition or, in some applications, bar code apparatus for reading address/destination information.

BACKGROUND ART

Various US and international postal services have developed sorting systems that optimize mailstream efficiency, e.g., maximize the number of mailpieces shipped with each mile traveled, while minimizing the labor content associated with mailpiece handling. These mailpiece sorters are fully automated and are operative to gather, scan/read, organize, convey and deposit individual mailpieces into one of a plurality of separate containers or bins. From the moment a postal service receives a full complement of mailpieces, each mailpiece may be sorted between three to six times, i.e., routed to or between various locations/stations, before being finally deposited/dropped into the correct chute or mailpiece tray.

These mailpiece sorting systems typically rely upon a host of state-of-the-art scanning, machine vision, and optical character recognition equipment to execute the sorting algorithms contained therein. The physical sortation is enabled by the ability of associated computer systems to interpret the scanned destination address and command the sorting equipment to direct each mailpiece to the appropriate destination during sorting operations. While many mailpiece sorters have been designed/developed for markets which employ a globally accepted language, e.g., English or Spanish, or have sophisticated postal systems such as the United States, United Kingdom, or Switzerland, mailpiece sorters are not yet available, or implementable, in countries having a language for which optical character recognition equipment has not been developed. Moreover, such territories may have a mailstream infrastructure which relies heavily upon human knowledge and/or intervention for the delivery of the mail. For example, some countries such as India or South Africa do not have an organized system of streets and/or street addresses for the entire territory. Consequently, mail may be delivered to some recipients based upon a mailperson's unique knowledge/memory of the physical whereabouts or location of a mail recipient. This lack of a complete network of machine readable/recognizable addresses for all destinations limits the application of automated sorting systems.

Despite the language barriers, poor infrastructure, and requirement for human intervention, automation of specific aspects of the mailstream can provide significant advantages. In FIG. 1 a conventional prior art mail delivery system/operation of the type described above is schematically depicted. That is, mail 100 is gathered and transported to a first post office 110 where the postage is verified/cancelled and the mail 100 is bundled for subsequent delivery. At a second or regional post office 120, a first manual sorting operation is performed to separate mailpieces into international and domestic mailpieces 130I, 130C. Those mailpieces 130I being delivered internationally, i.e., to any one of various international postal offices, 140A, 140B and 140C are sorted into bundles for delivery thereto. Mailpieces 130C remaining in-country are transported to a third or central office 150 where the mailpieces are again manually sorted into bundles 160A, 160B, 160C associated with various large geographic regions within the country e.g., internal states. Upon being sorted by state or geographic region, the mailpieces are once again transported to a plurality of local post offices 170A, 170B, 180A, 180B, 190A, 190B where the mailpieces are manually sorted into a finer grid of geographic regions such as townships or postal codes (if the country has designated such codes). The mailpieces RA, RB, RC, RD, RE, RF, RG, RH, may then be sorted to route sequence by knowledgeable mailpersons for delivery to the mail recipient.

In view of the foregoing example, it will be appreciated that the mail is transported as many as five (5) times on its journey from sender to recipient. Mailpiece delivery for a distribution system such as that described in FIG. 1 can typically take up to one (1) week. Hence, there may be little motivation or incentive for consumers to make use of such mailpiece delivery system. This is especially true when private mail distribution carriers can hand deliver mail in less time at no greater cost than a governmental body responsible for mail delivery. Finally, it will be apparent that the system is not only reliant upon human intervention, but is also dependant upon the physical transport and receipt of mailpieces by the individuals performing the manual sorting operation. That is, the knowledgeable humans must handle and view the face of each mailpiece to read the destination address.

A need, therefore, exists for a hybrid sortation system and/or method sorting/delivering mailpieces which reduces handling, streamlines the transport and speeds the delivery of mailpieces from sender to recipient.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

The invention will be fully understood when reference is made to the following detailed description taken in conjunction with the accompanying drawings.

SUMMARY OF THE INVENTION

A method and system is provided for sorting mail. The method includes the steps of imaging a face surface of the mailpieces to acquire mailpiece delivery information and distributing the mailpiece image to a virtual sorting station. The virtual sorting station is operative to sort each mailpiece image into one of a plurality of database files based upon common mailpiece delivery information. Depending upon the number of virtual sorting stations required to perform the sorting operation, the mailpiece delivery information contained in each database file may be processed by a system controller and/or transmitted to an automated mailpiece sorting device where each mailpiece is physically sorted using automated sorting equipment. The system for sorting mail includes an imaging device, a virtual sorting station for virtually sorting the mailpiece images and an automated sorting station for physically sorting the actual mailpieces. The system may include a plurality of virtual sorting stations wherein operators at each station provide address interpretation data to sort the mailpieces.

DETAILED DESCRIPTION

The present invention is described in the context of a mailpiece sorting system for a mail delivery system which has certain infrastructure limitations/deficiencies such as multiple language or geographic barriers. It should be appreciated, however, that the hybrid sorting system disclosed herein may be employed in any mail delivery system wherein human knowledge may substitute for or functionally replace the processing power of a computer, computer software or other forms of artificial intelligence.

Figure 1:
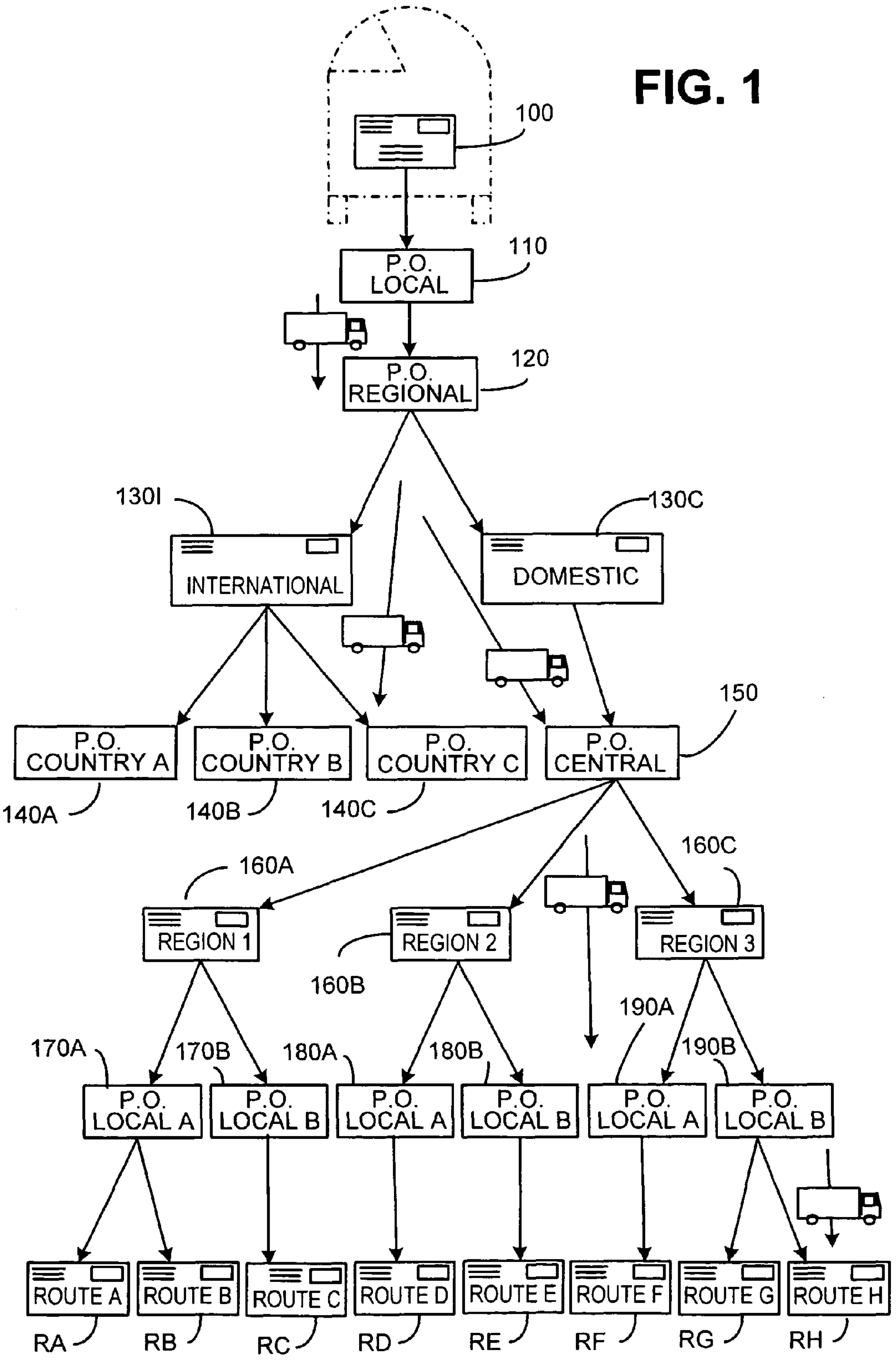
FIG. 1 is a schematic block diagram of a conventional prior art mailpiece delivery system.
Figure 2:
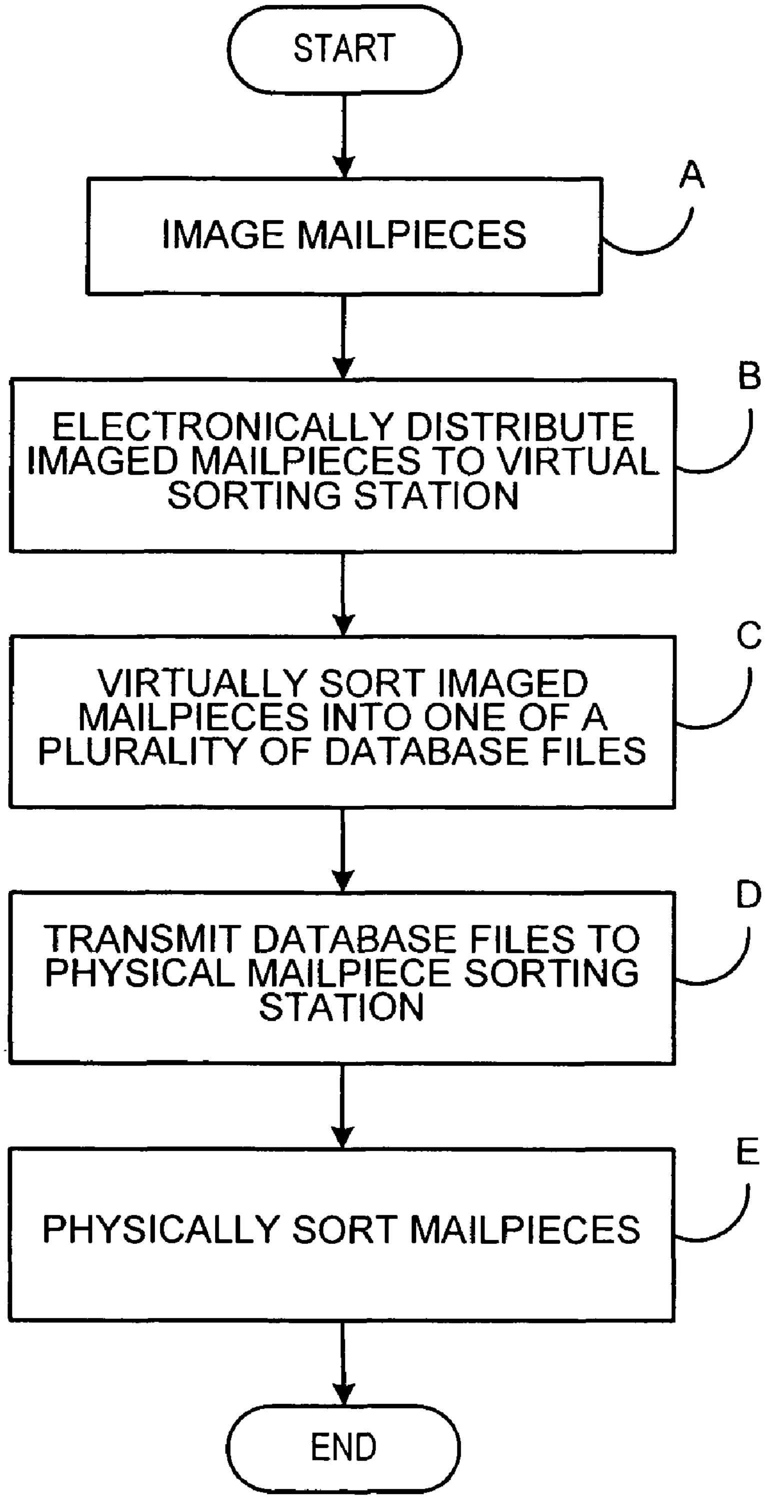
FIG. 2 is a flow diagram of the principal steps for practicing the inventive method.

In the broadest sense of the invention and referring to FIG. 2, a method is provided for sorting mail including, (i) imaging a face surface of the mailpieces to acquire mailpiece delivery information in a first step A, (ii) distributing the mailpiece image to a virtual sorting station in a second step B, virtually sorting the mailpiece images into one of a plurality of database files based upon common mailpiece delivery information, in a next step C, (iv) transmitting the mailpiece delivery information contained in each database file to an automated mailpiece sorting device, in step D, and (iv) sorting the mailpieces via the automated mailpiece sorting device in a final step E. It should be appreciated that the method steps A through E are performed in the context of a system controller (shown in subsequent schematic views) which captures, interprets, displays and/or appends mailpiece delivery information as the various steps are executed.

Figure 3:
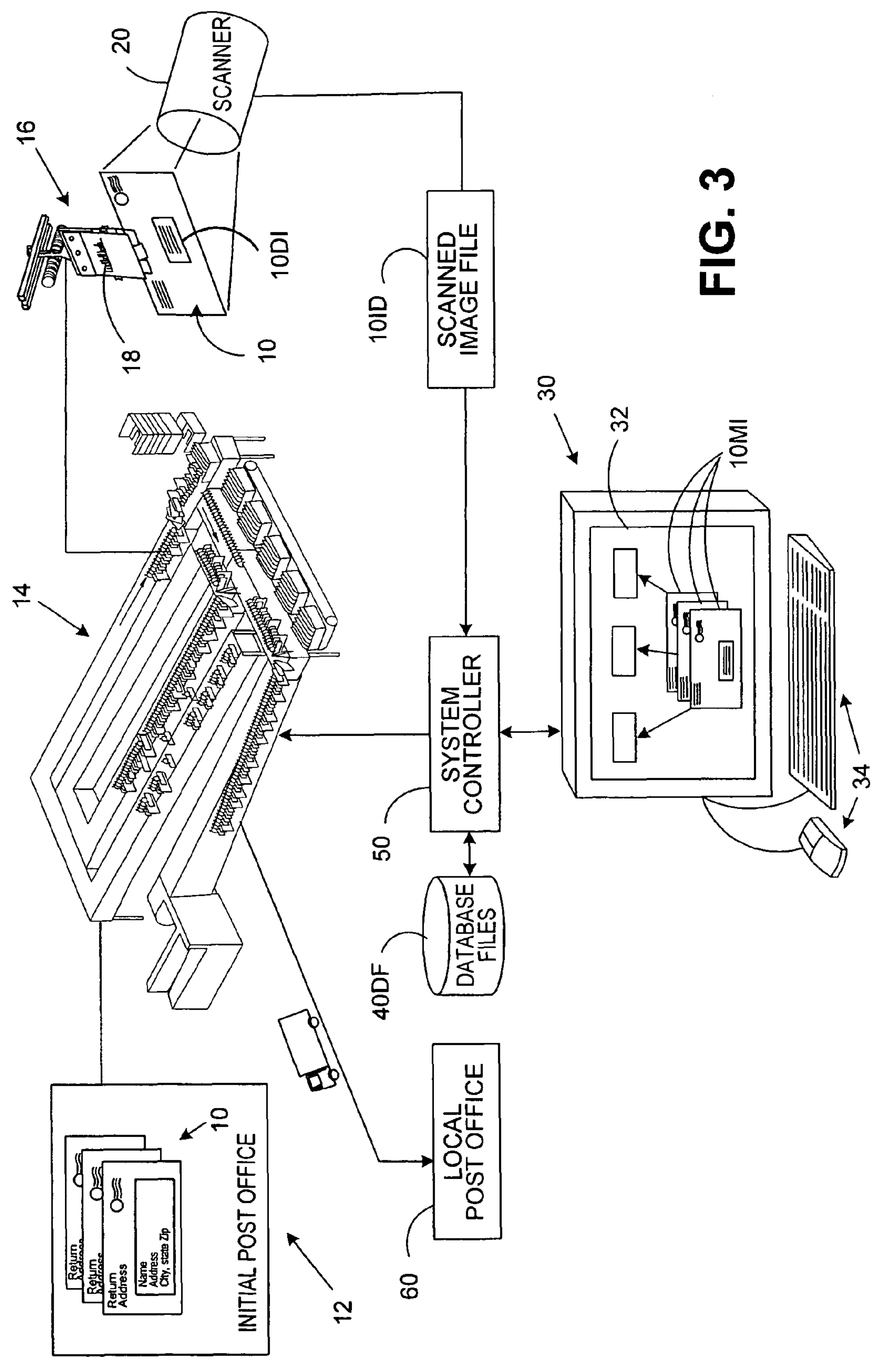
FIG. 3 is a schematic block diagram of a mailpiece delivery system which employs a combination of virtual and physical sorting stations for assigning scanned mailpiece images into one of a plurality of database files based upon common mailpiece delivery information.

More specifically, and referring to a schematic of a mailpiece delivery system shown in FIG. 3, mailpieces 10 are received at a central location or post office 12 where they may be loaded into an automated mailpiece sorting station 14 (also referred to as the "mailpiece sorter" 14). In the preferred embodiment, the automated mailpiece sorter 14 may be the same or similar to the type described in commonly-owned US Patent Applications Serial Numbers SN US2005/044560, SN US2005/044406, SN US2005/044413, SN US2006/012892, SN US2006/012861, SN US2006/012888. The automated mailpiece sorter 14 is capable of handling a variety of mailpiece shapes and sizes, i.e., mixed mail.

One of the principal features of the mixed mail sorter 14 relates to the use of a clamp assembly 16 operative to secure, transport and sort the mailpieces 10. In addition to its principle mechanical functions, each clamp assembly 16 includes a unique identifying mark 18 to identify the clamp assembly 16 and its associated mailpiece 10. The clamp assembly 16 may include a visible identifying mark or other identifying means, such as embedding an RFID chip in each clamp assembly. As such, the sorting operation may be performed by a combination of requisite information, i.e., electronically scanned information in connection with the mailpiece (e.g., its destination address), together with the identifying mark of the clamp assembly 16. Further, the sorting process may be performed without altering or marking the mailpiece such as via a printed barcode symbology or other identification mark.

While a clamp assembly 16 is shown to perform the various escort operations, it should be appreciated that the mixed mail sorter may include any one of a variety of devices for escorting the mailpiece throughout the sorting operation such as conventional pocket sorters currently employed to sort flat mail.

In the described embodiment, the mailpiece 10 is optically scanned using a conventional optical scanner 20, i.e., scanning equipment typically employed on mailpiece sorting apparatus. The scanner obtains an image of the mailpiece 10 to acquire the requisite mailpiece delivery information 10DI printed thereon. Thereafter, each mailpiece 10 may be secured in one of the clamp assemblies 16 of the automated sorting device 14 to await the execution of several intermediate steps, i.e., steps B, C and D of FIG. 2, before continuing the sorting operation. Alternatively, a more conventional mailpiece sorter (not shown) may be employed wherein the mailpieces 10 may be optically scanned and labeled with an identifying mark or serial number. Similarly, the mailpieces 10 are set aside to await the execution of steps B-D above before being handled once again by the mailpiece sorter. While the method and system described herein show the imaging/scanning step as occurring subsequent to the mailpiece being secured within a clamp assembly, it should be appreciated that the scanning step may occur in prior to or after a mailpiece being secured within a clamp assembly.

Notwithstanding the type of mailpiece sorting device employed, the scanned mailpieces or imaged mailpiece file 10ID is electronically distributed to at least one virtual sorting station 30. In the context used herein, a "virtual sorting station or device" includes an electronic apparatus/interface capable of displaying an electronic image of a mailpiece so an operator can sort/view/route mailpiece delivery information. The virtual sorting station may include a video display monitor capable of accepting an inputted interpretation of a user/operator. Another useful distinction relates to an operator's ability to apply knowledge of common mailpiece delivery information to sort the mailpieces into one of a plurality of database files (i.e., by a simple "drag and drop" feature of an input device). Additionally, such virtual sorting station 30 may be compared/contrasted to the "automated mailpiece sorter 14" which may be defined as handling/manipulating the actual mailpiece 10. The automated mailpiece sorter 14, therefore, sorts the actual mailpieces 10 based upon the mailpiece delivery information obtained from the virtual sorting station(s) 30.

While, in the broadest sense of the invention, a single Virtual Sorting (VS) station may be employed, in most common applications of the inventive method, a plurality of Virtual Sorting Stations (VSS's) 30 are utilized. More specifically, and referring to FIGS. 2, 3 and 4, the mailpiece images, in step C of FIG. 2, will be distributed to one of a plurality of virtual sorting stations 30A . . . 30E (FIG. 4) operative to sort the mailpiece images into one of a plurality of database files 40DF. Each of the VSS's 30A-30E will generally comprise a video or display monitor 32 (see FIG. 3) and an input device 34 such as a keyboard or mouse. In one embodiment, the VSS 30 may present a visual picture of the mailpiece image 10MI for viewing by a VSS operator (not shown).

Inasmuch as each VSS operator has a sphere of knowledge regarding his/her geographic region, a first VSS operator at, for example, VS Station 30A may be responsible for determining whether mailpieces remain in-country or are to be delivered to internationally, i.e., to other countries abroad. For those mailpieces 10MI remaining in-country, another VSS operator at a second VS station 30B may be responsible for determining the city or geographic region where in-country that mailpieces are to be handled/delivered. Upon determining the city, yet other VSS operators at third, fourth and fifth VS stations 30C, 30D, 30E may be responsible to determine the zone, district and/or mailpiece carrier (route) where a mailpiece is to be forwarded.

Figure 4:
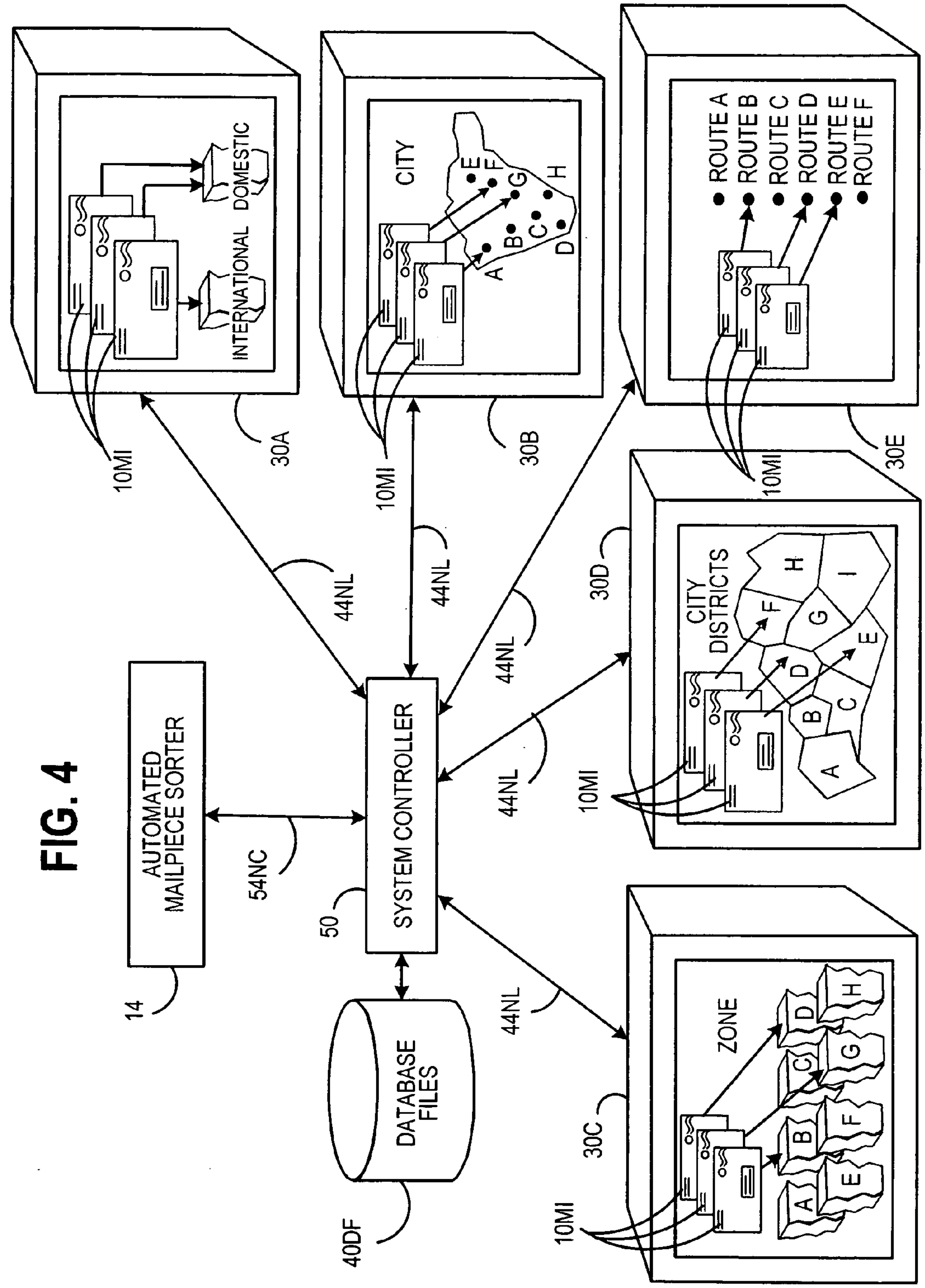
FIG. 4 is a schematic diagram of a virtual sorting station including a processing unit, a monitor, and an input device for displaying mailpiece images and bins/containers to an operator so that mailpieces may be virtually sorted.

While in the prior art, operators or mail carriers physically handled each mailpiece 10 to sort the mailpieces for subsequent delivery, the VS stations 30A-30E eliminate the requirement for handling the actual mailpieces (and associated transport from one post office to another) by presenting the VSS operators (not shown) with an image 10MI of the mailpiece and a means to electronically sort each mailpiece by assigning the mailpieces to one of a plurality of database files 40DF (seen in FIG. 4). Using current graphical user interface software, the VSS operator may command a cursor (using the input device 34) to highlight/select the mailpiece 10MI, drag and drop the same into one of a plurality of database files 40DF. Each database file 40DF may, therefore, represent a compilation of mailpiece information having common delivery attributes, i.e., common mailpiece delivery information such as town, zone, district, route etc. Alternatively, a simple dialog box may be displayed having a list of destinations which may be electronically selected by the VSS operator, i.e., clicking a checkbox, based upon common mailpiece delivery information.

Referring again to FIG. 4, when each of the mailpiece images 10MI have been virtually sorted, the system controller 50 may forward the mailpiece image and delivery information contained in the associated database files 40DF to yet other virtual sorting stations along network connection lines 44NL. For example, if at the second VS station 30B, the imaged mailpieces 10MI sorted into three database files 40DF, each database file 40DF may be independently forwarded to yet other VS Stations 30C, 30D or 30E. That is, one file 40DF containing mailpiece delivery information for a city at VS Station 30B may be compiled for a subsequent VS Station 30D to perform a more refined virtual sorting operation at a lower tier, i.e., city district level. Alternately, the system controller 50 can forward/route the information (image and associated database file) to an additional VS station as soon as a VS operator performs a virtual sort operation on the mailpiece image. As such, the mailpiece delivery information becomes more detailed, i.e., getting yet closer to its final mailpiece destination. While five (5) virtual sorting stations 30A-30E are shown, the invention contemplates any number of virtual sorting stations depending upon the infrastructure for sorting and delivering mail.

While the mailpiece data (i.e., delivery information 10MD, clamp identifier 18, etc.), scanned image data 10ID, database files 40DF, and routing data may be controlled by a plurality of individual processors tied or otherwise connected to its associated system element, the method and system for sorting mail 10 contemplates a master system controller 50 to process/manipulate the various electronic files. Specifically, the system controller 50 is operative to store the mailpiece image data 10ID and route the same to the first VSS 30A which, in the described embodiment, virtually sorts the mailpiece images 10MI into domestic or international database files 40DF. Inasmuch as the virtually sorted international mailpieces 10 have no further in-country destinations (and, consequently, no lower tier sort requirements), this database file 40DF may be immediately forwarded to the automated mailpiece sorter 14. As such, these mailpieces 10 may be identified, diverted, sorted and bundled for delivery to an international mailpiece distribution center (not shown). This intermediate step highlights one of the advantages of the inventive hybrid sorting system wherein sorting operations can begin or continue despite the fact that all mailpieces subject to being physically sorted have not been virtually sorted. That is, the system controller 50 can forward database files 40DF for use by the automated mailpiece sorter 14 when a particular database file is fully developed or completed at any time in the virtual sorting process.

As the mailpiece images 10MI are virtually sorted at each of the VSS's 30A-30E, new or additional information is appended to the database files 40DF by the system controller 50. Finally, when the mailpiece images 10MI have been sorted to the lowest tier practicable, the mailpiece delivery information, i.e., contained in the mailpiece data files 40DF, is electronically routed/transmitted by the system controller 50 to the automated mailpiece sorting device 14 (step D in FIG. 2) along the network connection line 54NC. Data transmission may be performed using any one of a variety of electronic data distribution methods such as via a high speed data link, network connection or internet data communication. Furthermore, such data link may be a direct hard-wired or wireless communication link/connection.

In step E of FIG. 2, the electronic mailpiece delivery information may then be used by the automated mailpiece sorter 14 to continue an actual or physical sort of the mail 10. That is, the automated mailpiece sorter 14 sorts each mailpiece based upon the unique identifier 18 on the clamp assembly 16 or identifier previously printed on each mailpiece 10. Specifically, the automated mailpiece sorter 4 may use the address information contained in each database file associated with each unique identifier to physically sort the mail. Conventional sorting algorithms, well-known in the art, may be used to perform the automated sorting operations which result in mailpieces being sorted, conveyed and deposited into various sorting bins or containers. Alternatively, if the mailpieces 10 are not held in a clamp assembly queue, the mailpieces 10 may be processed run through an automated mailpiece sorter 14 (perhaps for a second time), to sort, convey and deposit the mailpieces 10 into bundles, groups, sorting bins and/or containers.

With the actual mailpieces 10 sorted, the mailpieces 10 are transported to a destination proximal to or very near the mailpiece destination address. For example, the mailpieces 10 may be transported directly to local post offices 60 (see FIG. 3) where mail carriers, having knowledge of local mailpiece recipients, may hand carry the mail to its final destination address.

In summary, the present invention handles mailpiece 10 by a combination of physical and virtual sorting operations, i.e., a hybrid sorting system employing both physical and virtual sorting stations 14, 30. By imaging the mailpieces 10 and distributing the electronic mailpiece images 10MI, the mailing operation eliminates the intermediate transportation requirements of the prior art. As such, mailpiece delivery may be expedited by however number of days which was previously required to deliver the mailpieces 10 to the intermediate sorting stations/operations. Therefore, if five (5) sorting operations were previously required, e.g., country→state→county→town→route, and at least four (4) of these sorting operations represented intermediate sorting steps, each requiring the physical delivery of mail 10 to a subsequent sorting station/location, then as many as four (4) delivery steps may be eliminated by the sorting method and system of the present invention. That is, the virtual sorting stations 30 of the present invention can eliminate the four (4) delivery steps by transporting mail between intermediate sorting stations required by the method of the prior art.

Inasmuch as additional mail may be distributed by the inventive method/hybrid sorting system in less time, greater customer satisfaction may be achieved. Further, as the speed of delivery is more competitive with that of private mail distribution carriers, business volume and, accordingly, mailstream revenue may also rise.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for sorting mailpieces comprising the steps of:

imaging a face surface of the mailpieces to acquire mailpiece delivery information;

distributing the mailpiece image to a plurality of virtual mailpiece sorting stations;

virtually sorting the mailpiece images into one of a plurality of database files based upon common mailpiece delivery information;

transmitting the mailpiece delivery information contained in each database file to an automated mailpiece sorting station; and physically sorting each mailpiece via the automated mailpiece sorting station, wherein a first of the plurality of virtual sorting stations is configured to virtually sort the mailpieces to a first level sort and provides the first level sort to a second of the plurality of virtual sorting stations configured to virtually sort the mailpieces to a second level sort which is of a lower tier.

2. The method according to claim 1 wherein the step of distributing the mailpiece image includes the steps of distributing the mailpiece images to one of a plurality of virtual sorting stations, each virtual sorting station including a user interface operative to assign the mailpiece images into one of a plurality of database files and further includes the step of distributing the mailpiece image to a subsequent virtual sorting station based upon common delivery attributes.

3. The method according to claim 2 wherein the virtual sorting stations each include a display monitor and an input device for recording inputs indicative of operator commands, and wherein the step of virtually sorting the mailpiece images comprises the steps of:

successively displaying each of the mailpiece images on the display monitor; and providing a plurality of sorting options indicative of mailpiece destination and recording inputs made by an operator indicative of the selected mailpiece destination.

4. The method according to claim 2 wherein the virtual sorting stations each include a display monitor having a graphical user interface (GUI) and an input device for recording inputs indicative of operator commands, and wherein the step of virtually sorting the mailpiece images comprises the steps of:

successively displaying each of the mailpiece images on the display monitor, providing a plurality of icons indicative of the subsequent sorting stations on the display monitor, and recording inputs made by an operator assigning each of the mailpiece images to one of the icons.

5. The method according to claim 1 wherein the step of imaging a face surface of the mailpieces includes the steps of scanning each mailpiece and assigning a unique identifier thereto for subsequent mailpiece sorting operations.

6. The method according to claim 5 wherein the step of scanning each mailpiece and assigning a unique identifier thereto includes the steps of loading each mailpiece into a clamp assembly of a mailpiece sorter, the clamp assembly having a unique identifier such that mailpieces may be identified by the associated clamp assembly.

7. The method according to claim 5 wherein the step of scanning each mailpiece and assigning a unique identifier thereto includes the steps of optically scanning each mailpiece and applying an identifying mark to the face of the mailpiece.

8. The method according to claim 7 wherein the step of transmitting data includes an electronic communication link from the group of: a high speed data link, network connection and internet data communication.

9. The method according to claim 1 wherein physical sorting operations begin or continue despite that all mailpieces subject to being physically sorted have not been virtually sorted.

10. A method for delivering mail comprising the steps of:

receiving a plurality of mailpieces;

imaging a face surface of the mailpieces to acquire mailpiece delivery information;

distributing the mailpiece image to a network having at least one virtual sorting station;

virtually sorting the mailpiece images into one of a plurality of database files based upon common mailpiece delivery information;

transmitting the mailpiece delivery information contained in each database file to an automated mailpiece sorting device;

sorting each mailpiece via the automated mailpiece sorting device; and delivering the sorted mailpieces, wherein physical sorting operations begin or continue despite that all mailpieces subject to being physically sorted have not been virtually sorted.

11. The method according to claim 10 wherein the step of distributing the mailpiece image includes the steps of distributing the mailpiece images to one of a plurality of virtual sorting stations, each virtual sorting station including a user interface operative to assign the mailpiece images into one of a plurality of database files and further including the step of routing the mailpiece image to a subsequent virtual sorting station based upon the assignments.

12. The method according to claim 11 wherein the virtual sorting stations each include a display monitor and an input device for recording inputs indicative of operator commands, and wherein the step of virtually sorting the mailpiece images comprises the steps of successively displaying each of the mailpiece images on the display monitor; providing a plurality of sorting options indicative of mailpiece destination and recording inputs made by an operator indicative of the selected mailpiece destination.

13. The method according to claim 11 wherein the virtual sorting stations each include including a display monitor having a graphical user interface (GUI) and an input device for recording inputs indicative of operator commands, and wherein the step of virtually sorting the mailpiece images comprises the steps of successively displaying each of the mailpiece images on the display monitor, providing a plurality of icons indicative of the subsequent sorting stations on the display monitor, and recording inputs made by an operator assigning each of the mailpiece images to one of the icons.

14. The method according to claim 10 wherein the step of imaging a face surface of the mailpieces includes the steps of scanning each mailpiece and assigning a unique identifier thereto for subsequent mailpiece sorting operations.

15. The method according to claim 14 wherein the step of scanning each mailpiece and assigning a unique identifier thereto includes the steps of loading each mailpiece into a clamp assembly of a mailpiece sorter, the clamp assembly having a unique identifier such that mailpieces may be identified by the associated clamp assembly.

16. The method according to claim 14 wherein the step of scanning each mailpiece and assigning a unique identifier thereto includes the steps of optically scanning each mailpiece and applying an identifying mark to the face of the mailpiece.

17. The method according to claim 16 wherein the step of transmitting data includes an electronic communication link from the group of: a high speed data link, network connection and internet data communication.

18. The method according to claim 10 wherein the virtually sorting the mailpiece images includes distributing the sorted mailpiece images to a plurality of virtual sorting stations operative to sort the mailpiece images into respective database files of the plurality of database files.

19. The method according to claim 18 wherein a first of the plurality of virtual sorting stations is configured to virtually sort the mailpieces to a first level sort and provides the first level sort to a second of the plurality of virtual sorting stations configured to virtually sort the mailpieces to a second level sort which is of a lower tier.

20. The method according to claim 19 further comprising forwarding the mailpiece image and delivery information contained in associated database files of the plurality of database files associated with the first of the plurality of virtual sorting stations to the second virtual sorting station along network connection lines.

21. A hybrid system for sorting mail comprising:

an imaging device operative to acquire mailpiece delivery information from a face surface of a mailpiece:

a network of at least one virtual sorting station operative to receive the imaged mailpieces and sort each mailpiece image into one of a plurality of database files based upon common mailpiece delivery information;

an automated mailpiece sorting station operative to receive the virtually sorted mailpiece delivery information contained in each database file and sort each mailpiece using sorting algorithms, and a system controller operative to acquire and store mailpiece delivery information from the imaging device, send a mailpiece image file to the network of virtual sorting stations and record the database files produced therefrom, and route the database files to the automated mailpiece sorting station to physically sort the mailpieces, wherein the at least one virtual sorting stations includes a plurality of virtual stations configured to provide a different sort level based on common mailpiece delivery information.

22. The hybrid sorting system according to claim 21 further comprising a plurality of virtual sorting stations, wherein each virtual sorting station includes a user interface operative to assign the mailpiece images into one of a plurality of database files, the system controller, furthermore, operative to route the mailpiece image to a subsequent virtual sorting station based upon common delivery attributes.

23. The hybrid sorting system according to claim 22 wherein the virtual sorting stations each include a display monitor having a graphical user interface (GUI) and an input device for recording inputs indicative of operator commands, and wherein the step of virtually sorting the mailpiece images comprises the steps of successively displaying each of the mailpiece images on the display monitor, providing a plurality of icons indicative of the subsequent sorting stations on the display monitor, and recording inputs made by an operator assigning each of the mailpiece images to one of the icons.

24. The hybrid sorting system according to claim 21 wherein the imaging device is an optical scanner and wherein the automated mailpiece sorting device includes a plurality of clamp assemblies for securing each mailpiece, the clamp assembly including a unique identifier for identifying each mailpiece during mailpiece sorting operations.

25. The hybrid sorting system according to claim 21 further comprising an electronic communications link for transmitting mailpiece delivery information from the virtual sorting station to the automated sorting station, the electronic communications link being from the group of: a high speed data link, network connection and internet data communication.

26. The hybrid system according to claim 21 wherein the automated mailpiece sorting station is operative to begin or continue physical sorting operations despite that all mailpieces subject to being physically sorted have not been virtually sorted.

* * * * *